US005946810A

United States Patent [19]
Hoelderlin et al.

[11] Patent Number: 5,946,810
[45] Date of Patent: Sep. 7, 1999

[54] SABER SAW

[75] Inventors: Andreas Hoelderlin, Besigheim, Germany; Aldo Di Nicolantonio, Recherswil; René Gentinetta, Nidergesteln, both of Switzerland

[73] Assignee: Robert Bosch GmbH, Stuttgart, Germany

[21] Appl. No.: 08/913,891

[22] PCT Filed: Feb. 20, 1996

[86] PCT No.: PCT/DE96/00258

§ 371 Date: Sep. 11, 1997

§ 102(e) Date: Sep. 11, 1997

[87] PCT Pub. No.: WO96/28274

PCT Pub. Date: Sep. 19, 1996

[30] Foreign Application Priority Data

Mar. 16, 1995 [DE] Germany ............................ 195 09 539

[51] Int. Cl.$^6$ ............................ B23D 51/10; B23B 31/22
[52] U.S. Cl. ................................ 30/392; 279/30; 279/75
[58] Field of Search ............................ 30/338, 392, 394; 279/30, 75, 80

[56] References Cited

U.S. PATENT DOCUMENTS

| 3,663,028 | 5/1972 | King, Jr. et al. . | |
|---|---|---|---|
| 3,730,540 | 5/1973 | King, Jr. et al. . | |
| 3,750,283 | 8/1973 | Hoffman | 30/338 |
| 4,204,692 | 5/1980 | Hoffman . | |
| 4,299,402 | 11/1981 | Hoffman | 279/30 |
| 4,528,753 | 7/1985 | Kuhlmann et al. | 279/80 |
| 5,306,025 | 4/1994 | Langhoff . | |
| 5,573,255 | 11/1996 | Salpaka | 279/75 |
| 5,575,071 | 11/1996 | Phillips et al. | 30/392 |

FOREIGN PATENT DOCUMENTS

| 0404764B1 | 3/1993 | European Pat. Off. . |
| 0544129 | 6/1993 | European Pat. Off. . |
| 0623413 | 3/1994 | European Pat. Off. . |
| 4102011 | 12/1991 | Germany . |

*Primary Examiner*—Hwei-Siu Payer
*Attorney, Agent, or Firm*—Michael J. Striker

[57] ABSTRACT

In a saber saw machine having a device for chucking the saw blade a locking device is provided which firmly holds a chucking tube relative to a reciprocating rod in the release position for the saw blade, and which by the insertion of the saw blade into the device releases the chucking tube again.

10 Claims, 10 Drawing Sheets

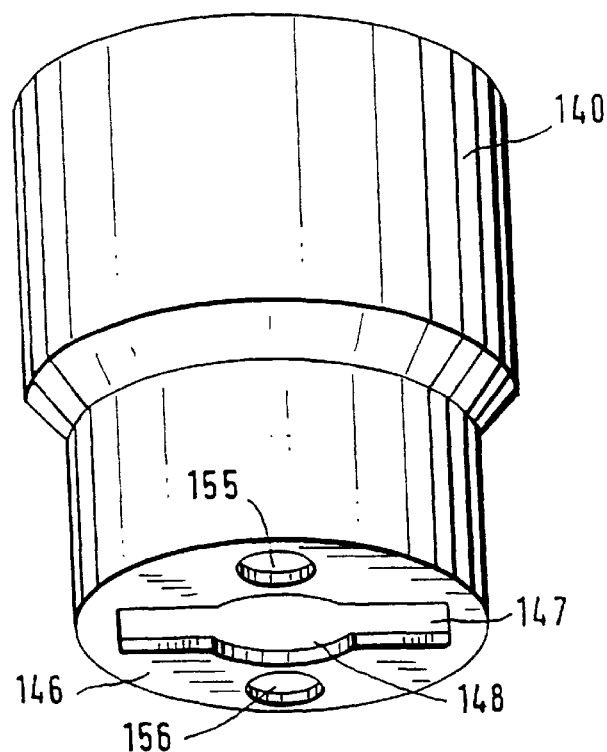
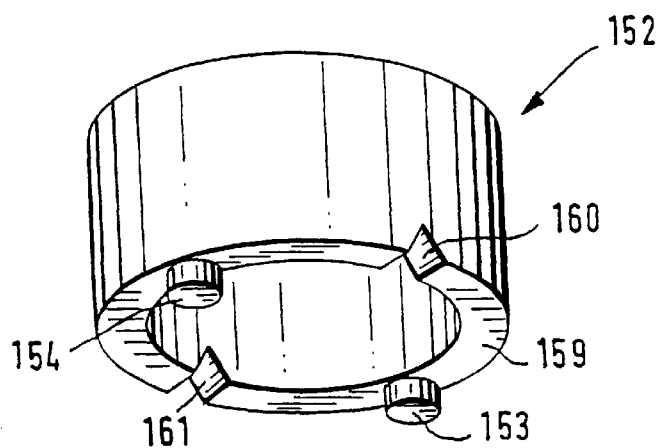
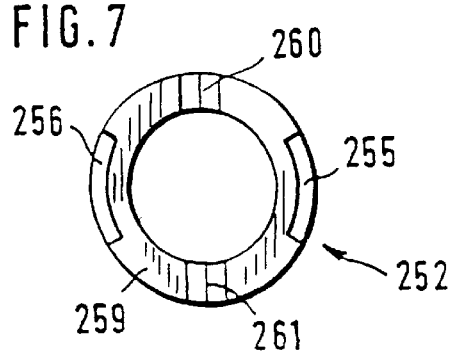
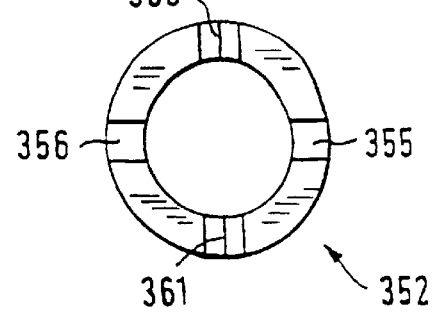

SABER SAW

BACKGROUND OF THE INVENTION

The invention is based on a saber saw machine.

European Patent Disclosure EP 404 764 and U.S. Pat. No. 3,750,283 disclose saber saw machines in which the saw blade is clamped relatively reliably and is easy to remove and clamp in place again. The known embodiments have the disadvantage that the chucking device, for changing saw blades, has to be dealt with inconveniently near the saw blade, in other words with both hands: one hand introduces the saw blade while the other hand actuates the chucking mechanism and at the same time has to hold the machine. This presents the danger of injury from touching the sawteeth, because it is difficult when changing saw blades to firmly hold the saber saw securely at the same time.

To safely change saw blades, the saber saw machine must be clamped in a screw vise, for instance, or held on an underlying support or against the body, leaving both hands free to change the saw blade. This safe variant for changing saw blades is very time-consuming, however, and a chucking device for firmly holding the saber saw is not always available.

SUMMARY OF THE INVENTION

The saber saw machine according to the invention is provided with locking means which firmly hold a chucking tube relative to a reciprocating rod in a release position for the saw blade, and which by the insertion of the saw blade into the device releases the chucking tube again.

The saber saw machine with these features has the advantage over the prior art that the saw blade can be changed conveniently and quickly with only one hand, while with the other hand the machine can be securely held, without requiring a chucking device for holding the machine.

Because of the convenient, safe manipulation, the danger of injury when changing saw blades is reduced substantially. Moreover, the time expenditure for changing a saw blade is markedly less than in the known saber saw machines. As a result, particularly in the industrial field, higher productivity is attainable.

BRIEF DESCRIPTION OF THE DRAWINGS

FIG. 5 shows an exemplary embodiment of a chucking tube;

FIG. 6 shows a further exemplary embodiment of a centering tube;

FIGS. 7 and 8 show two further exemplary embodiments of centering tubes, seen from below;

DESCRIPTION OF THE PREFERRED EMBODIMENTS

Figure 1:
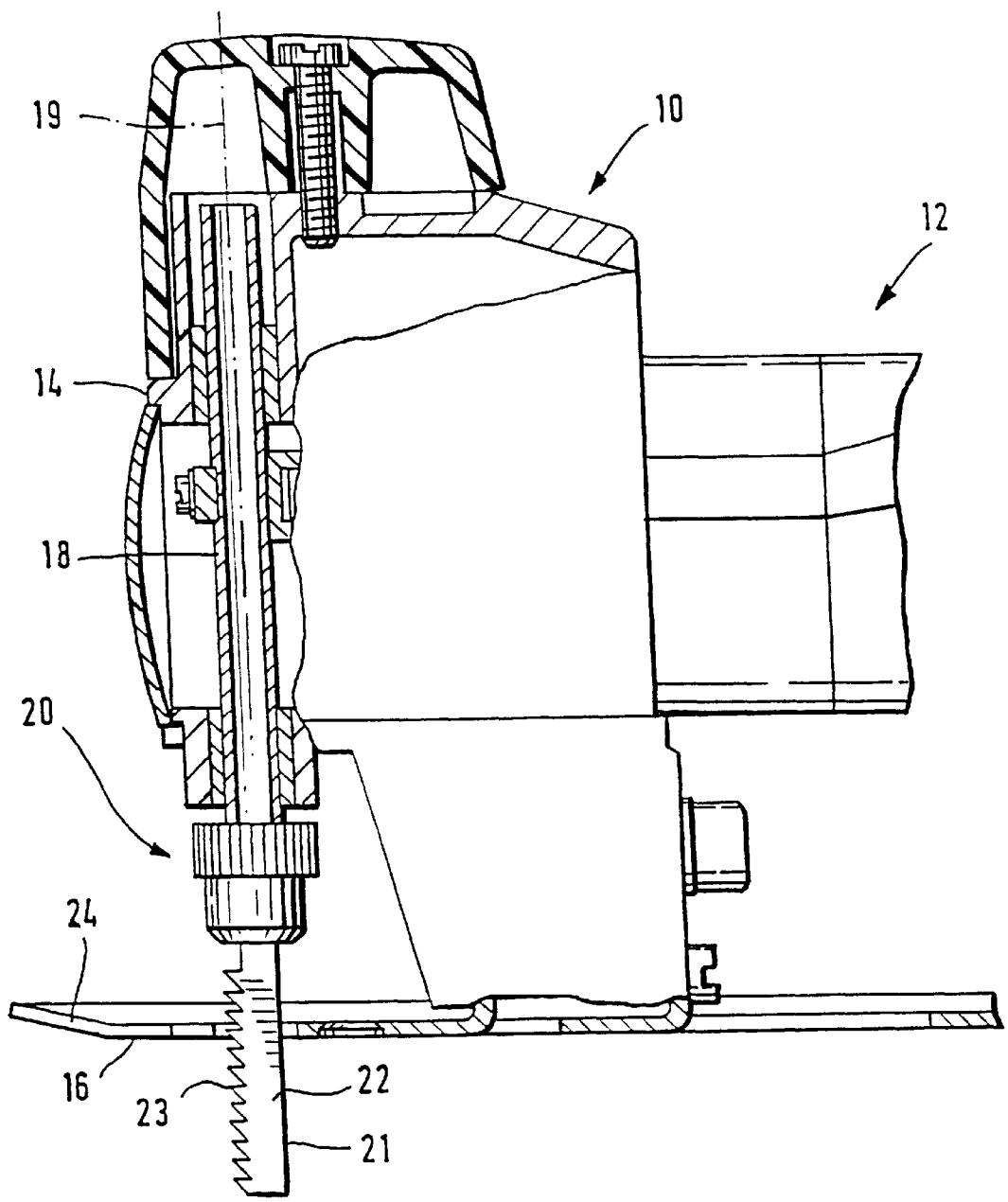
FIG. 1 is a fragmentary longitudinal section through an exemplary embodiment of the saber saw of the engine.

FIG. 1 shows a saber saw 10, with a machine housing 12 embodied as a handle and a gear housing 14, the housings being mounted on a base plate 16 by means of which the saber saw machine 10 is supported, in guidable fashion, on a workpiece that is not shown. A tubular reciprocating rod 18 emerging at the bottom from the gear housing 14 and having the reciprocating rod axis 19 carries a tubular device 20 on its lower end. This device is prestressed by a torsion spring 42 (FIG. 2) and serves to clamp or chuck a saw blade 22 that has a back 21 and a tooth side 23 and that passes through a V-shaped recess 24 in the base plate 16.

Figure 2:
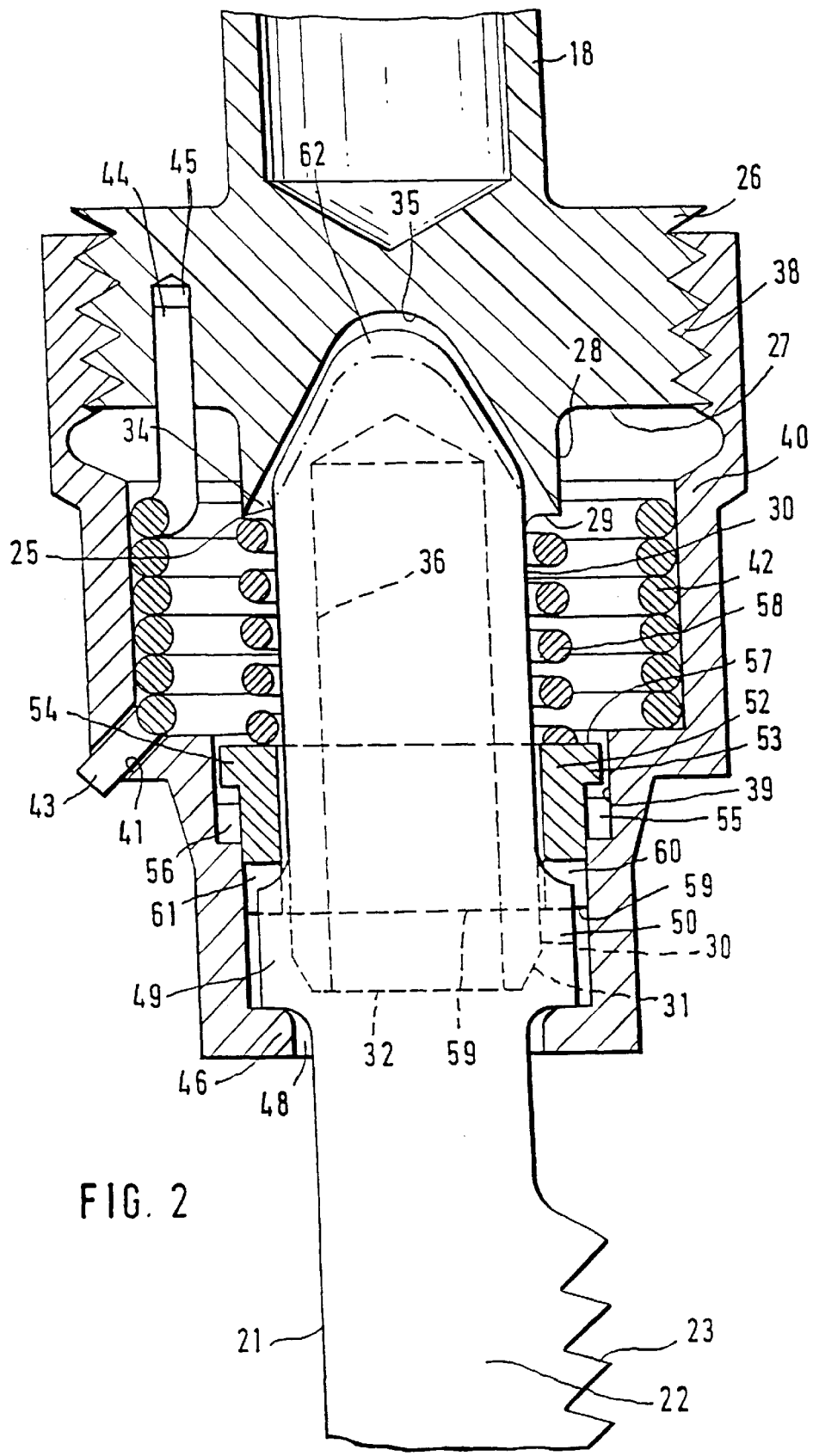
FIG. 2 shows a longitudinal section of the device for chucking the saw blade.

FIG. 2 shows a longitudinal section through an exemplary embodiment of the lower region of a reciprocating rod 18. Toward the bottom in the viewing direction, the reciprocating rod changes from an upper tubular region into a shaft collar of larger diameter with an externally threaded part 26 and then, via two shoulders 27, 29, into smaller diameter regions 28, 30. The smaller diameter region 30 continues in the form of a tubular connector whose end, shown in dashed lines, changes into a chamfer 31 and the end edge 32, which is also shown in dashed lines. The longitudinal edges of the tubular connector 30 coincide with the contour of the chucking end of the saw blade 22. This will become clear by comparing FIGS. 2 and 3.

The reciprocating rod 18 has a central centering slot 34 (FIG. 3) that extends from the lower edge 32 as far as the inside of the externally threaded part 26. In the externally threaded part 26, the centering slot 34 forms a tapering centering slot end 35. The tubular connector 30 is provided with a central inner bore 36, shown in dashed lines.

The externally threaded part 26 is circumferentially engaged by an internally threaded part 38 of a chucking tube 40, which is coupled to the reciprocating rod 18 via the torsion spring 42. A lower end 43 of the spring to that end engages a radial opening 41 in the chucking tube 40, while an upper end 44 of the spring extends within an axial bore 45 in the externally threaded part 26.

On its lower end, the chucking tube 40 changes into a radially inward-drawn collar 46, which has a through opening 48 for the saw blade 22. On the inner face end of the collar 46, the saw blade 22 is supported by the lower face ends of its lugs 49, 50. With the upper face ends of its lugs 49, 50, the saw blade 22 is braced against the lower face end of a centering tube 52. With outer cams 53, 54, in the chucking position of the chucking tube 40, the centering tube 52 engages an undercut 39 of the chucking tube 40, which changes axially toward the bottom into detent grooves 55, 56. As a result, in this position, the chucking tube 40 is rotatable relative to the centering tube 52.

In the opened position of the chucking tube 40, after the emergence of the saw blade 22, the outer cams 53, 54 lock in detent fashion, as a result of axial displacement of the centering tube 52, into the detent grooves 55, 56 of the chucking tube 40, locking it in its rotary position relative to the reciprocating rod 18. A compression spring 58 is supported between the upper face end 57 of the centering tube 52 and the shoulder 29 of the reciprocating rod 18.

The lower face end 59 of the centering tube 52 has one central V-shaped centering groove 60, 61 each on diametrically opposed sides of its edge; these grooves are aligned with one another, and the upper face ends of the lugs 49, 50 of the saw blade 22 enter into them. The chucking end 25 of the saw blade is centered in the end 35 of the centering slot 34.

Figure 3:
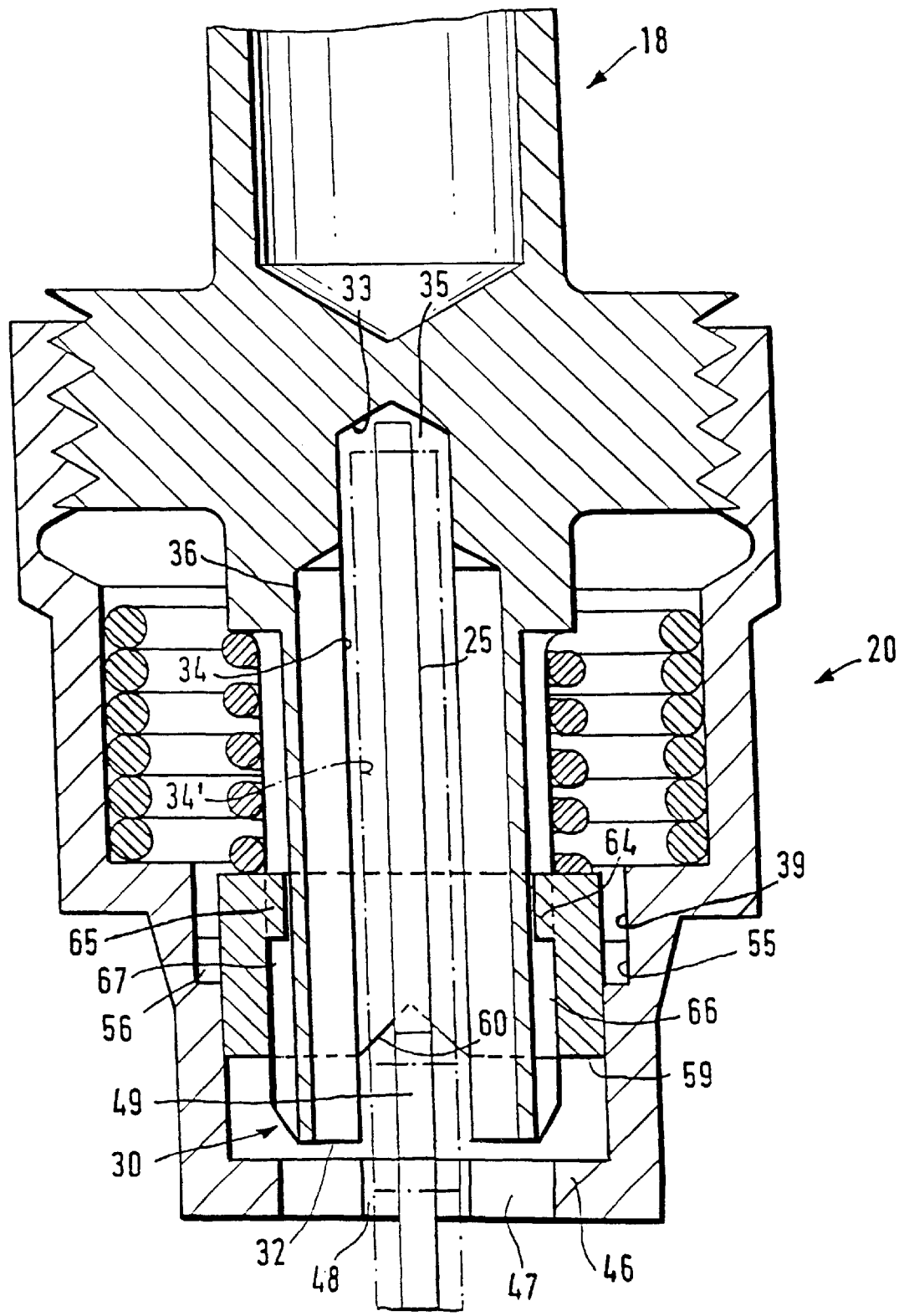
FIG. 3 is a view rotated about its longitudinal axis compared to FIG. 2.

FIG. 3 shows the reciprocating rod of FIG. 2, rotated 90° about its longitudinal axis. In conjunction with this, only those parts needed for better understanding of the drawing will be identified by reference numeral or mentioned. It becomes clear here that the upper end 35 of the centering slot 34 is embodied as a V profile 33, and that the centering slot 34 passes through the inner bore 36. The positions of the end edge 32 of the reciprocating rod 18, the through opening 48, and the radial slot 47 through which the lugs 49, 50 of the saw blade 22 pass, are also clearly seen, as is the centering position of the lug 49 of the chucking end 25 of the saw blade in the V groove 60 of the centering tube 52.

The centering slot 34 is wider than the thickness of the saw blade 22 in the region of its chucking end 25. A dot-dashed line 34' inside the centering slot 34 indicates the contour of the maximum saw blade thickness that can be used in the device 20.

It can also be seen that the centering tube 52, with inner cams 64, 65 each in one guide groove 66, 67 extending axially on the outside of the tubular connector 30, firmly holds in a manner that is secured against relative rotation but is axially displaceable relative to the reciprocating rod 18.

For releasing the saw blade 22, the chucking tube 40 is rotated and thus displaced axially downward, counter to the action of the torsion spring 42. The chucking tube 40 can rotate freely relative to the outer cams 53, 54, as long as the lower edges of the outer cams 53, 54 are positioned in the undercut 39. As a consequence of the force of the compression spring 58, the centering tube 52 is displaced axially downward, in the course of which the outer cams 53, 54 engage the detent grooves 55, 56, and the inner cams 64, 65 hold themselves in a manner fixed against relative rotation on the lower region of the reciprocating rod 18. In this process the centering grooves 60, 61 of the lower face end 59 are braced on the upper face ends of the saw blade lugs 49, 50 and together with the saw blade 22 follow its axial motion downward.

Figure 17:
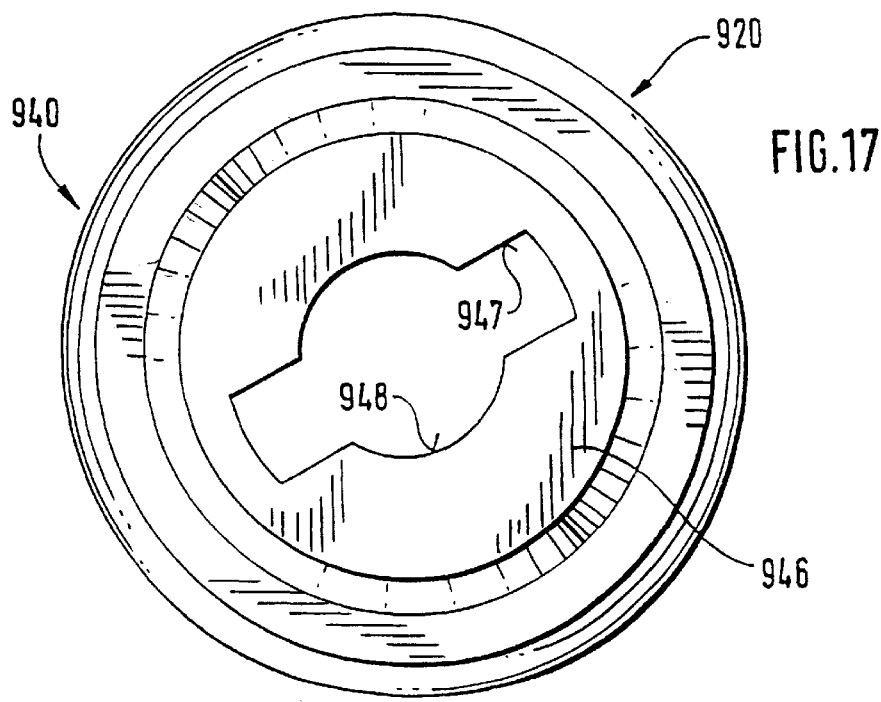
FIG. 17 is a view of FIG. 16 from below.
Figure 20:
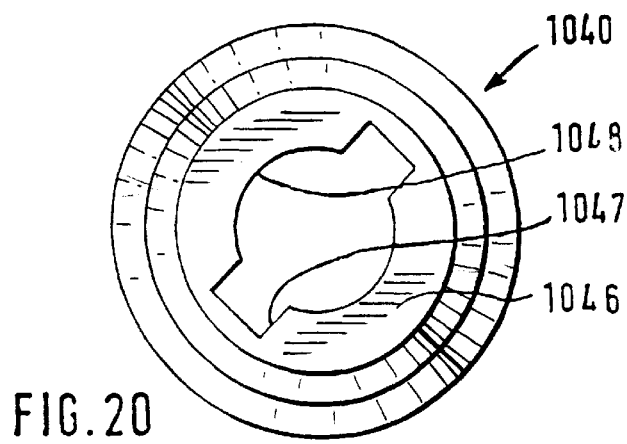
FIG. 20 is a view of FIG. 18 from below.

If the radial slot 47 of the chucking tube 40, which slot is clearly shown in FIGS. 17 and 20, is in alignment with the plane of the saw blade 22, then the saw blade 22 can emerge freely to the outside. The centering tube 52, disposed on the lower region of the reciprocating rod 18 in a manner fixed against relative rotation engages the detent grooves 55, 56 of the chucking tube 40 with its outer cams 53, 54 and thus holds the chucking tube 40 firmly relative to the reciprocating rod 18 in the open position.

When a new saw blade 22 is reinserted by inserting its chucking end 25 into the through opening 48 or the radial slot 47, the saw blade lugs 49, 50 act upon the lower face end 59 of the centering tube 52 and displace it axially upward, counter to the action of the compression spring 58. As a result, the outer cams 53, 54 are expelled axially from the detent grooves 55, 56, so that the chucking tube 40 is unlocked. As a result, following the prestressing force of the torsion spring 42, the chucking tube 40 can rotate be displaced axially in the process. By rotation of the radial slot 47 relative to the plane of the saw blade 22, the collar 46 engages the lower face ends of the saw blade lugs 49, 50 from below and displaces them axially onward until they strike the outermost end 62 of the saw blade, at the end 35 of the centering slot.

As a result, the reinserted saw blade 22 is centered and fastened conveniently, in a way that can be done with only one hand.

Figure 4:
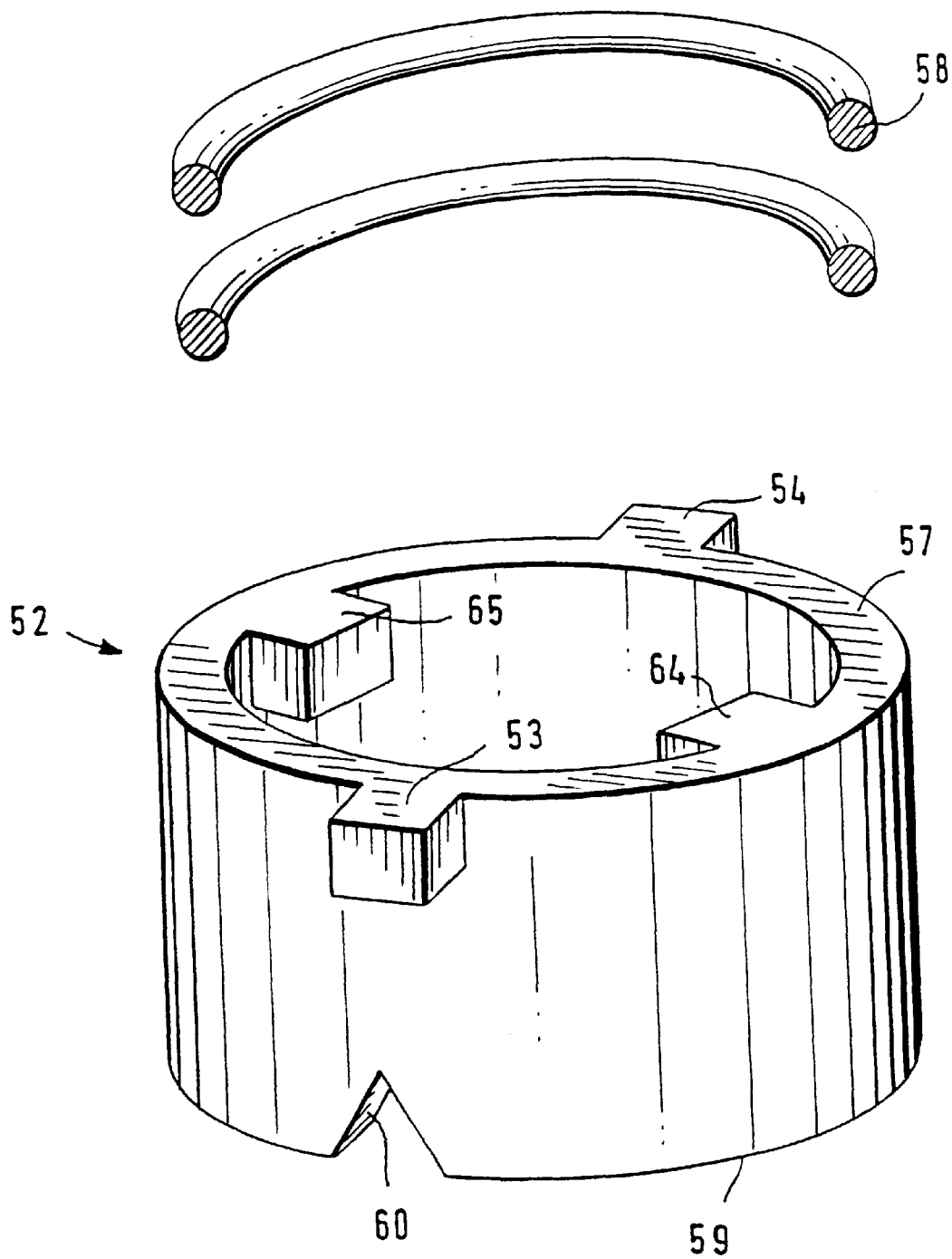
FIG. 4 shows an exemplary embodiment of a centering tube of FIGS. 2 and 3.

In FIG. 4, a three-dimensional view of the centering tube 52 of FIGS. 2 and 3 is shown along with the compression spring 58. In it, the form and disposition of the outer cams 53, 54, inner cams 64, 65, upper face end 57, lower face end 59, and V-shaped centering groove 60 are clear.

FIG. 5 shows a variant of a chucking tube 140 with a through opening 148 and a radial slot 147 through which the chucking end of a saw blade can pass and also shows a collar 146 with axial openings, diametrically opposite one another, which serve as a detent bore 155, 156 for axial outer cams 153, 154 (FIG. 6) of a centering tube 152.

In FIG. 6, a centering tube 152 is shown, which is intended to be jointly with the chucking tube 140 of FIG. 5 and which on its lower face end 159 has two V-shaped centering grooves 160, 161 and two axial outer cams 153, 154, which are intended to pass through the detent bores 155, 156 of the chucking tube 140 of FIG. 5.

In FIGS. 7 and 8, variants of centering tubes 252, 352 are shown, showing their lower face ends 259 with the V-shaped centering grooves 260, 261, 360, 361. Also shown are detent recesses 255, 256, 355, 356, which are associated with the cams of suitably embodied chucking tubes, not shown.

Figure 9:
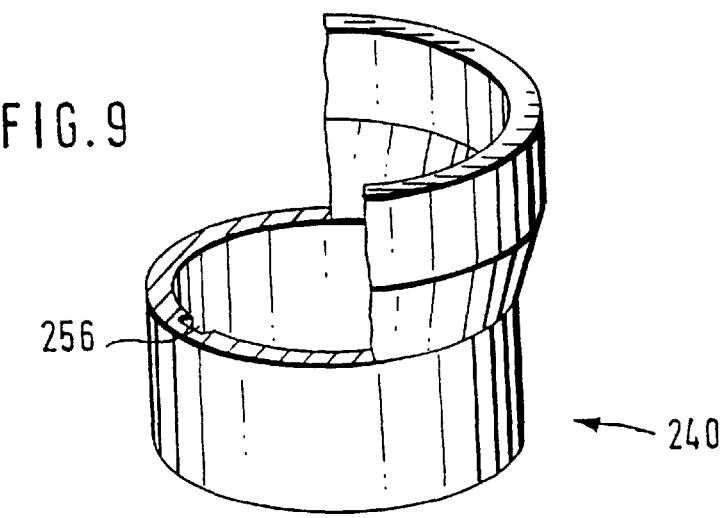
FIGS. 9, 10 and 11 show three exemplary embodiments of chucking tubes.
Figure 10:
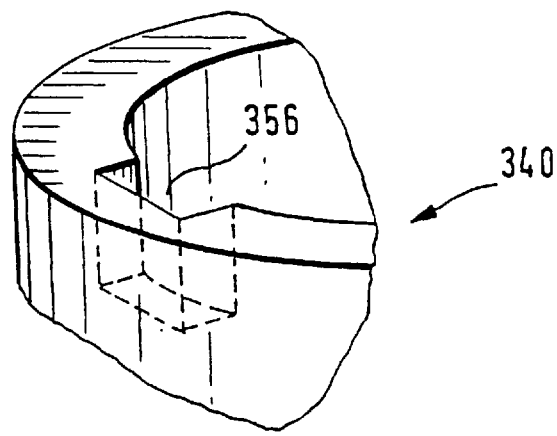
Figure 11:
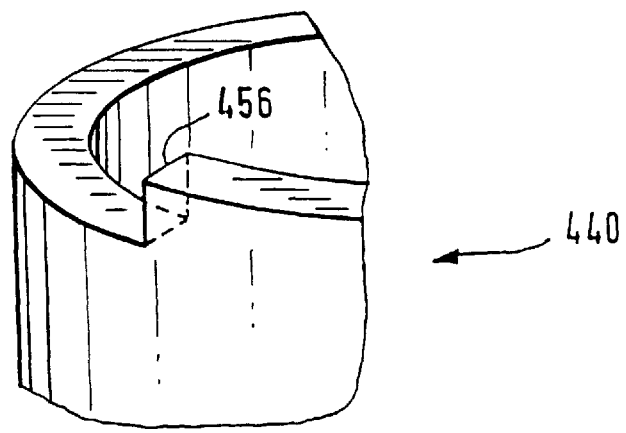

FIGS. 9, 10 and 11 show variants of chucking tubes 240, 340, 440 in three-dimensional views, shown partly cutaway or as fragmentary details. Clearly visible here are a respective detent groove 256, 356 or detent edge 456 for engagement of or for stopping radial outer cams or similar retaining means of suitably designed centering tubes, not shown.

The chucking tube 340 shown in detailed form in FIG. 10 has a square, boxlike radial detent groove 356, and the chucking tube 440 shown in FIG. 11 has a detent edge 456, embodied as a stop that can be overlooked in stepped fashion, at which the outer cams of a suitably designed centering tube firmly hold the chucking tube 240–440 in engagement with the detent grooves 256–456 in a manner fixed against relative rotation with respect to the reciprocating rod.

Figure 12:
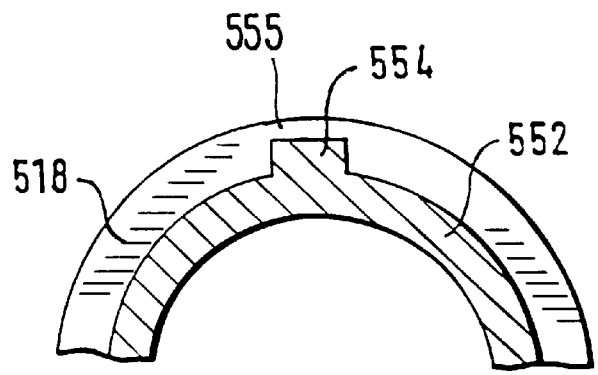
FIGS. 12, 13, 14 and 15 shows cross sections, each of two variants of pairs of reciprocating rods and centering tubes.
Figure 13:
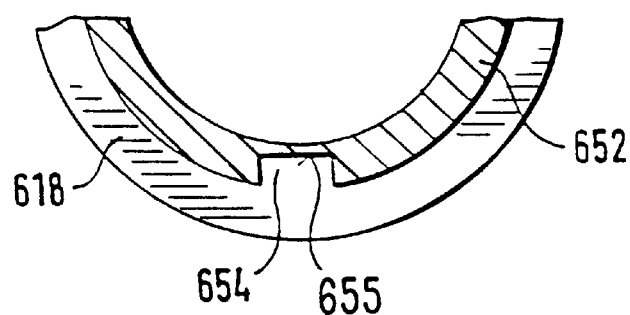

FIGS. 12 and 13, in cross section, show how centering tubes 552, 652 are disposed relative to reciprocating rods 518, 618 and how they can be embodied. It is clearly seen that both the centering tube 552 and the reciprocating rod 618 can have radial cams 554 and 654, respectively, if each of the opposite sides have detent grooves 555, 665 for receiving the cams 554, 654. Conversely, both the reciprocating rod 518 and the centering tube 652 may have detent grooves 555, 656.

Figure 14:
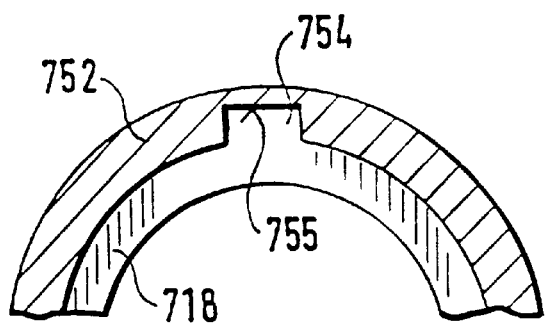
Figure 15:
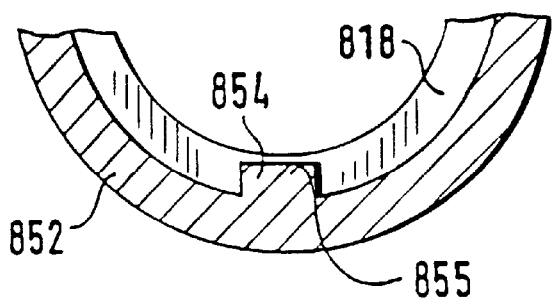

Comparing FIGS. 12 and 13 with FIGS. 14 and 15 also clearly shows that the reciprocating rods 518, 618, 718, 818 can be disposed on either the outside or the inside relative to the centering tubes 552, 652, 752, 852, given a suitable design of the means 554, 555, 654, 655, 754, 755, 854, 855.

Figure 16:
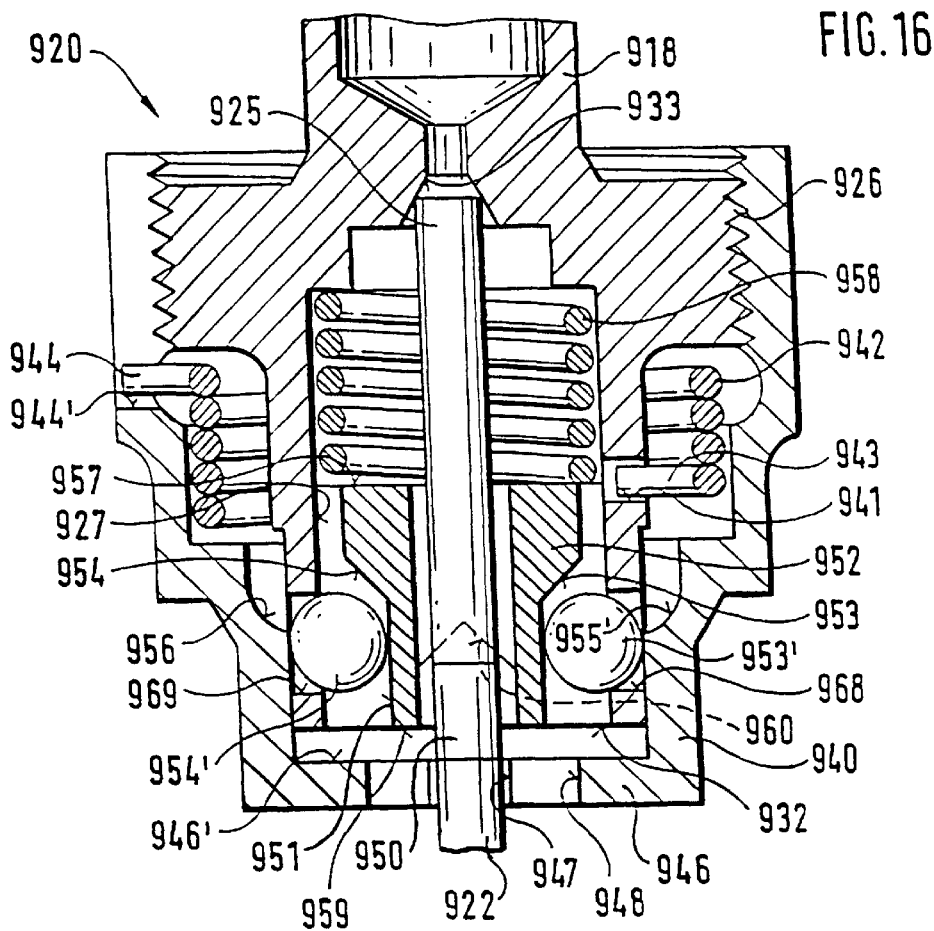
FIG. 16 shows a longitudinal section through a further exemplary embodiment of a chucking device.

In FIG. 16, a reciprocating rod 918 with a device 920 for chucking a saw blade 922 is shown, in which unlike the exemplary embodiment of FIGS. 2 and 3, the centering tube 952 is disposed in the interior of the reciprocating rod 918, held in an axially displaceable manner but fixed against relative rotation.

The cylindrical centering tube has two opposed stepped, that is, angled, groove paths, each forming one oblique face 953, 954. With the oblique faces 953, 954, by axial displacement of the centering tube 952, detent balls 953', 954' are radially displaceable in radial bores 968, 969 in the lower region of the reciprocating rod 918.

The remaining layout of the device 920 is similar to that of FIGS. 2 and 3: The slender reciprocating rod 918 changes radially outward in stepped fashion into a collarlike externally threaded part 926. After that, the contour of the reciprocating rod 918 extends radially inward in stepped fashion, and from there with reduced diameter extends essentially in a straight line as far as the lower edge 932. In the region near its lower edge 932, the reciprocating rod 918 has one radial bore 968, 969 on each of opposed sides.

In its interior, the reciprocating rod 918 has a central axial stepped bore 927, which lends the lower region of the reciprocating rod 918 its tubular form. The central stepped bore 927 ends in a conical bore 933.

A chucking tube 940 is disposed, guided by threads, on the externally threaded part 926 of the reciprocating rod 918. In its lower region, the chucking tube 940 changes radially inward into a collar 946, whose inside contour is formed by a through opening 948 and a radial slot 947. Adjacent the radial bores 968, 969 of the reciprocating rod 918, the chucking tube 940 has one detent groove 955, 956 each on the inside circumference of each bore.

The reciprocating rod 918 and the chucking tube 940 are coupled to one another in prestressed fashion via a torsion spring 942; the lower end 943 of the spring engages a radial recess 941' in the reciprocating rod 918, and the upper end 944 of the spring engages a radial recess 944' of the chucking tube 940. By suitable prestressing of the torsion spring 942, the chucking tube 940 is held relative to the externally threaded part 926 in an axially upward-displaced stop position.

A compression spring 958 is supported on the upper face end 957 of the centering tube 952 and seeks to press the centering tube 952 downward relative to the reciprocating rod 918. Detent balls 953', 954 are disposed in a radial interstice between the cylindrical region 951 of the centering tube 952 and the stepped bore 927. These balls are seated in the radial bores 968, 969 in the wall of the reciprocating rod 918.

The short side of the upper region of the chucking end 925 of the saw blade is centered and chucked in the conical bore 933 in the upper region of the reciprocating rod 918. The upper face ends of the lugs 949, 950 of the saw blade are centered in a V groove 960 in the lower face end 959 of the centering tube 952. The inner face end 946' of the collar 946 of the chucking tube 940 is supported on the lower face ends of the legs 950 of the saw blade. The inner face end 946' thus firmly holds the saw blade 922 in the device 920 in a way secure against escaping at the bottom or being lost.

In FIG. 17, a view of the device 920 from below shows the chucking tube 940 with the design of its through opening 948, radial slot 947 and collar 946.

The device 920 functions as follows: For releasing the saw blade 922, the chucking tube 940 is rotated in its thread relative to the externally threaded part 926; because of the threaded connection with the externally threaded part 926, there is a simultaneous axial displacement downward. In a certain stop position, further rotation of the chucking tube 940 is not possible, and in this position the detent grooves 955, 956 are aligned with the radial bores 968, 969.

The saw blade 922 follows the axial displacement of the chucking tube 940 axially downward. The centering tube 952 follows the saw blade 922, as a result of the action of the compression spring 958, with the centering groove 960 supported on the saw blade lugs 949, 950. The oblique faces 953, 954 then come to rest on the detent balls 953', 954' and displace them radially outward. This causes the detent balls 953', 954' to enter the detent grooves 955, 956. As a consequence of the force of the compression spring 958, the position of the detent balls 953', 954' is assured via the centering tube 952; the balls 953', 954' are supported radially on the larger diameter region of the centering tube 952. The action of the detent balls 953', 954' locks the chucking tube 940 in its rotated position. The chucking tube 940 cannot move back into its outset position; its radial slot 947 in the open position is aligned with the plane of the saw blade 922, and the saw blade 922 can be easily removed at the bottom. When the functions described proceed in rapid succession, ejection of the saw blade 922 occurs.

For inserting a new saw blade 922, the saw blade is introduced axially upward by its chucking end 925 into the through opening 948 or radial slot 947 of the chucking tube 940. As soon as the upper face ends of the saw blade lugs 949, 950 comes to rest against the centering groove 960, the centering tube 952 is moved axially upward, together with the saw blade 922, counter to the compression spring 958. Via the oblique faces 953, 954, the centering tube 952 uncovers the detent balls 953', 954'. As a consequence of the action of the torsion springs 942 and the resultant torsional action by the chucking tube 940, the detent balls 953', 954' are moved out of the detent grooves 955, 954 back into the radial interstice between the centering tube 956 and the central stepped bore 927. The chucking tube 940 is now unlocked and can rotate further and at the same time be displaced axially upward. In this process, the radial slot 947 rotates relative to the saw blade lugs 950, 949, so that the inner face ends 946' of the collar 946 act axially upon the lower face ends of the saw blade lugs 949, 950 and are displaced farther axially upward until the chucking end 925 of the saw blade rests in centered fashion in the conical bore 933. The saw blade 922 is thus centered and chucked, or in other words secured against axially emerging from the device 920.

Figure 18:
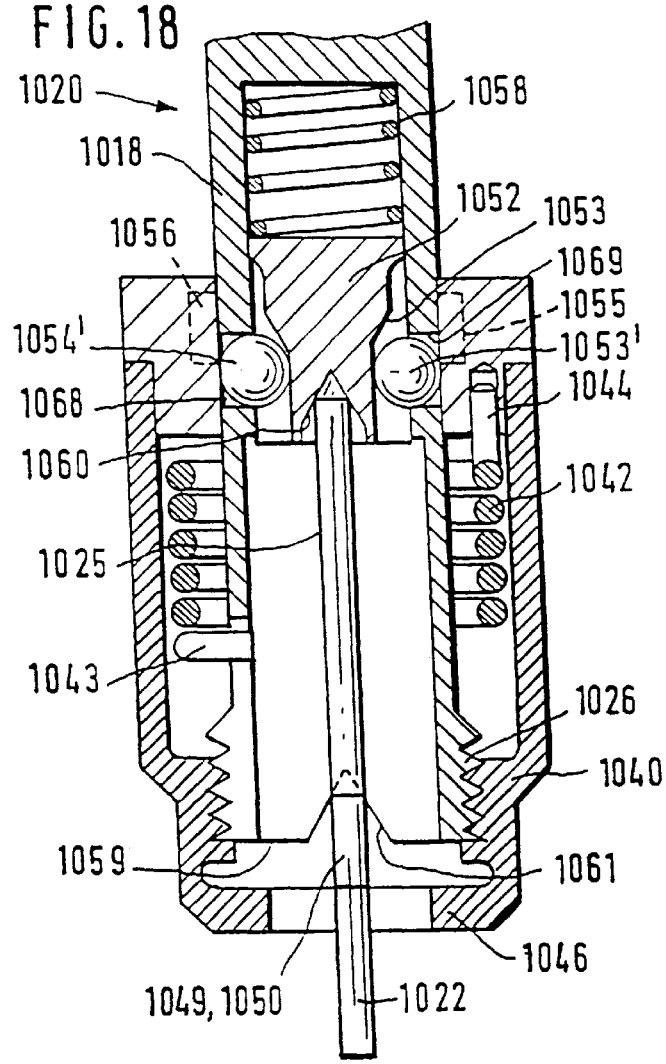
FIG. 18 shows a longitudinal section through a further exemplary embodiment of a chucking device.
Figure 19:
FIG. 19 is a cross section through the detent groove, as a detail of FIG. 18.

In FIGS. 18, 19 and 20, a further exemplary embodiment of a device 1020 for chucking a saw blade 1022 is shown. In contrast to the variant of FIGS. 16, 17, only the upper region of the chucking end 1025 is guided in a centering piece 1052 in an upper groove 1060. The saw blade lugs 1049, 1050 are supported in centering fashion in a lower centering groove 1061 that is machined into the lower face end 1059 of the reciprocating rod 1018.

The reciprocating rod 1018, in its lower region, has an externally threaded part 1026 that is screwed to an internal thread of a chucking tube 1040.

Disposed in the interior of the upper region of the reciprocating rod 1018 is a compression spring 1058, which axially acts upon the centering piece 1052. The centering piece 1052 has an encompassing oblique face 1053. Upon axial displacement, this oblique face acts upon the detent balls 1053', 1054', which are seated in radial bores 1068, 1069 in the wall of the reciprocating rod 1018. The upper wall region of the chucking tube 1040, adjacent the radial bores 1068, 1069, has ball detent grooves 1055, 1056, which are axially and radially offset from the radial bores 1068, 1069 in the upper chucking position of the chucking tube 40.

Between the outer wall of the reciprocating rod 1018 and the inner wall of the chucking tube 1040, there is a torsion spring 1042 with an upper end 1044 and a lower end 1043.

The ends 1043, 1044 of the spring hold firmly in openings designated in further detail at one end on the reciprocating rod 1018 and at the other on the chucking tube 1040.

FIG. 20 shows a view of the chucking tube 1040 of FIG. 18 from below, with the design of the radial slot 1047, the through opening 1048, and the collar 1046 substantially agreeing with that shown in FIG. 17.

The mode of operation is as follows: For releasing the saw blade 1022, the chucking tube 1040 is rotated relative to the reciprocating rod 1018 in such a way that it moves axially downward. In a lower stop position, in which the radial slot 1047 is in alignment with the central plane of the saw blade 1022, the ball detent grooves 1055, 1056 are also aligned with the radial bores 1068, 1069, so that the detent balls 1053', 1054' move radially outward into the ball detent grooves 1055, 1056, thus locking the rotary position of the chucking tube 1040 relative to the reciprocating rod 1018. The detent balls 1053', 1054' are held pressed radially outward by the action of the oblique face 1053 upon axial displacement of the centering piece 1052. The centering piece 1052 follows the force of the compression spring 1058 axially downward along with the motion of the saw blade 1022, which follows the axial motion downward of the chucking tube 1040.

In the locked position of the chucking tube 1040 relative to the reciprocating rod 1018, the saw blade 1022 can be removed easily.

In rapid succession of the functional sequences described above, the saw blade 1022 is ejected. That is, the saw blade 1022 need not be removed while pointing downward; on the contrary, this can be done easily even if the saw blade axis is positioned horizontally or the saw blade is oriented vertically upward.

For chucking the saw blade, a new saw blade is introduced by its chucking end 1025 axially upward into the through opening 1048 or the radial 1047 or in the direction of the centering piece 1052. First, the free end of the chucking end 1025 comes to rest in the centering groove 1060 of the centering piece 1052. The centering piece 1052 follows the axial motion of the saw blade 1022 and is displaced upward with it in the reciprocating rod 1018. Counter to the force of the compression spring 1058. Via the oblique faces 1053, the centering piece 1052 uncovers the detent balls 1053', 1054', so that they can be said to be ejected from the ball detent grooves 1055, 1056 by the torsional force of the torsion spring 1042. As a result, the chucking tube 1040 can be removed upward into its chucking position relative to the reciprocating rod 1018 as a consequence of the torsion on the part of the torsion spring 1042. Because the radial slot 1047 rotates relative to the plane of the saw blade 1022, the collar 1046 engages the saw blade lugs 1049, 1050 from below and displaces the saw blade 1022 axially into its terminal position until the upper end faces of the lugs 1049, 1050 contact the lower centering groove 1060, 1061. In this position, the saw blade 1022 is centered, chucked, and secured against being lost.

FIG. 19 shows a sectional view of the ball detent groove 1055, 1056 of the chucking tube 1040 with a semicircular contour. As a result of this contour, the expulsion of the detent balls 1053', 1054' upon unlocking of the chucking tube 1040 is accomplished.

Figure 21:
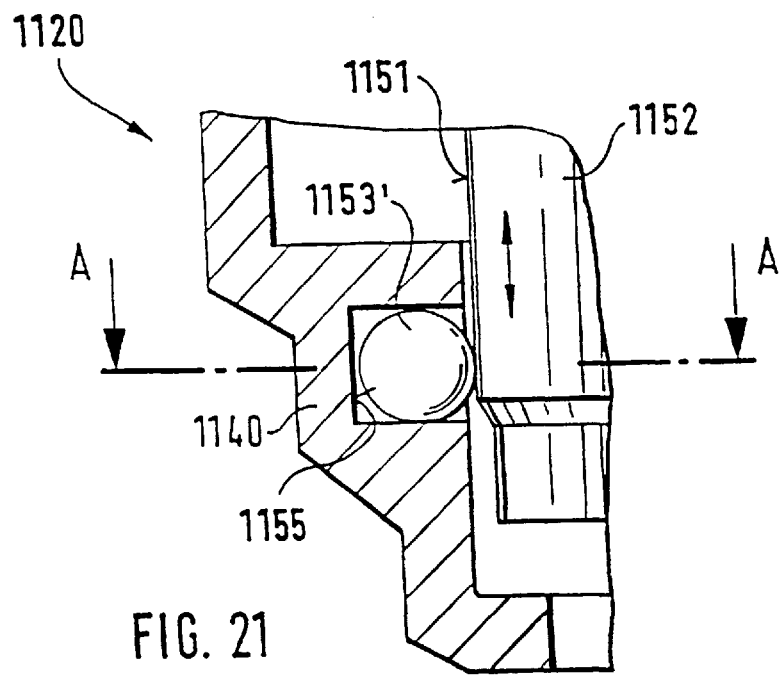
FIGS. 21 and 22 shows a further exemplary embodiment of the chucking devices, in the form of a longitudinal section and cross section, respectively.

In FIG. 21, a further exemplary embodiment of a device 1120 for chucking a saw blade is shown, in which a centering piece 1152 is disposed axially displaceably relative to a chucking tube 1140; a locking ball 1153', because of the design of a detent groove 1155, radially acts upon a cylindrical region 1151 of the centering piece 1152 and holds it clampingly firmly through the action of the torsion spring, which is not shown here. In the open position without a saw blade, the chucking tube 1140 is rotatable in only one direction. As soon as a saw blade is introduced and thus the centering piece 1152 is raised, the chucking tube 1140 automatically rotates back into its chucking position.

Figure 22:
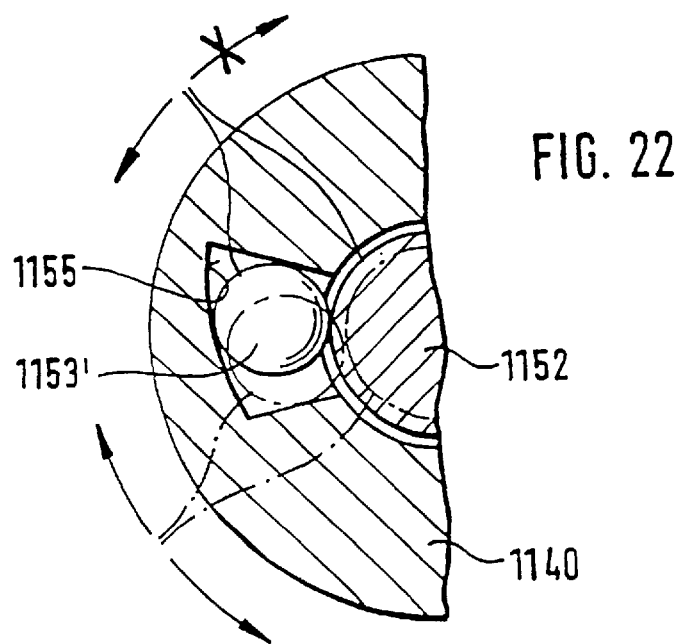

In FIG. 22, a section is shown along the arrows AA of FIG. 21; it clearly shows the contour of the detent groove 1155 and the position of the locking ball 1153' in both the clamping position and the release position. In particular the radially outwardly rising course of the outer contour of the detent groove 1155 is clearly shown.

When a saw blade is introduced, the centering piece 1152 is displaced upward relative to the reciprocating rod/chucking tube. The centering piece 1152 can rotate in freewheeling fashion. When no saw blade is in place, then the centering piece 1152 cancels out the play. Clamping occurs upon rotation in the closing direction.

We claim:

1. A saber saw machine (10) having a device (20, 1020, 1120) for chucking a saw blade (22, 922, 1022) on the lower end of a reciprocating rod (18, 918, 1018, 1118), wherein a chucking tube (40, 140, 240, 340, 440, 940, 1040, 1140, 1240), disposed axially displaceably and rotatably on the reciprocating rod (18, 918, 1018, 1118), has on its free lower end an inwardly protruding encompassing collar (46, 146, 946, 1046, 1146) with a through opening (48, 148, 948, 1048, 1148) and a radial slot (47, 147, 947, 1047, 1147), wherein the collar (46, 146, 946, 1046, 1146), in the chucking position, is braced axially against lugs (49, 50, 1049, 1150) of the saw blade (22, 1022, 1122) and thus keeps the chucking end (25, 1025, 1125) of the saw blade pressed in a recess on the lower end portion of the reciprocating rod (18, 918, 1018, 1118) or against a resilient intermediate piece (52, 152, 252, 352, 452, 552, 652, 752, 852, 952, 1052, 1152), characterized in that the device (20, 1020, 1120) has locking means (53, 54, 153, 154, 255, 256, 355, 356, 953', 954', 1053', 1054', 1153'), which firmly hold the chucking tube (40, 140, 240, 340, 440, 540, 640, 740, 840, 940, 1040, 1140, 1240) relative to the reciprocating rod (18, 918, 1018, 1118) in the release position for the saw blade (22, 1022, 1122), and which by the insertion of the saw blade (22, 1022, 1122) into the device (20, 1020, 1120) release the chucking tube (40, 140, 240, 340, 440, 540, 640, 740, 840, 940, 1040, 1140, 1240) again.

2. The saber saw machine of claim 1, characterized in that the locking means (53, 54, 153, 154, 255, 256, 355, 356, 953', 954', 1053', 1054', 1153') are adjustable relative to the reciprocating rod (18, 918, 1018, 1118) and the chucking tube (40, 140, 240, 340, 440, 540, 640, 740, 840, 940, 1040, 1140, 1240), and releasably lock them relative to one another in the release position for the saw blade (22, 922, 1022).

3. The saber saw machine of claim 1, characterized in that the locking means (53, 54, 153, 154, 255, 256, 355, 356, 953', 954', 1053', 1054', 1153') are adjustable by means of a spring means-supported displacement piece (52, 152, 252, 352, 452, 552, 652, 752, 852, 952, 1052, 1152).

4. The saber saw machine of claim 1, characterized in that the intermediate piece (52, 152, 252, 352, 452, 552, 652, 752, 852, 952, 1052, 1152) is embodied as a centering sleeve with centering grooves (60, 61), on which grooves the saw blade (22, 1022, 1122) is braced in positioning fashion by its lugs (49, 50; 1049, 1050).

5. The saber saw machine of claim 4, characterized in that the centering sleeve (52, 152) has outer cams (53, 54; 153,

154), which to form the locking means enter into detent grooves (55, 56; 155, 156) of the chucking tube (40, 140).

6. The saber saw machine of claim 4, characterized in that the centering sleeve (952, 1052, 1152) is braced via oblique faces (953, 954, 1053, 1054, 1153, 1154) on detent balls (953', 954'), and upon axial motion positively displaces these balls radially into detent grooves (955, 956, 1055, 1056, 1155, 1156) of the chucking tube (94, 1040, 1140).

7. The saber saw machine of claim 1, characterized in that the chucking tube (40, 940, 1040) is axially guided relative to the reciprocating rod (18, 918, 1018) via an externally threaded part (26, 926, 1026) near the lower edge (32, 932, 1032) of the reciprocating rod (18, 918, 1018).

8. The saber saw machine of claim 1, characterized in that the chucking end (925) of the saw blade is braced in centering fashion on a centering slot (933, 934, 935) of the reciprocating rod (918).

9. The saber saw machine of claim 1, characterized in that the intermediate piece is embodied as a centering piece (1052), on whose centering groove (1060), embodied as a centering bore, the outermost end of the chucking end (1025) of the saw blade is braced.

10. A chucking device for chucking a saw blade of a saber saw machine on the lower end of a reciprocating rod, wherein a chucking tube, disposed axially displaceably and rotatably on the reciprocating rod, has on its free lower end an inwardly protruding encompassing collar with a through opening and a radial slot, wherein the collar, in the chucking position, is braced axially against lugs of the saw blade and thus keeps the chucking end of the saw blade pressed in a recess on the lower end portion of the reciprocating rod or against a resilient intermediate piece, characterized in that the chucking device comprising locking means, which firmly hold the chucking tube relative to the reciprocating rod in the release position for the saw blade, and which by the insertion of the saw blade into the device release the chucking tube again.

\* \* \* \* \*